: 2,983,340
Patented May 9, 1961

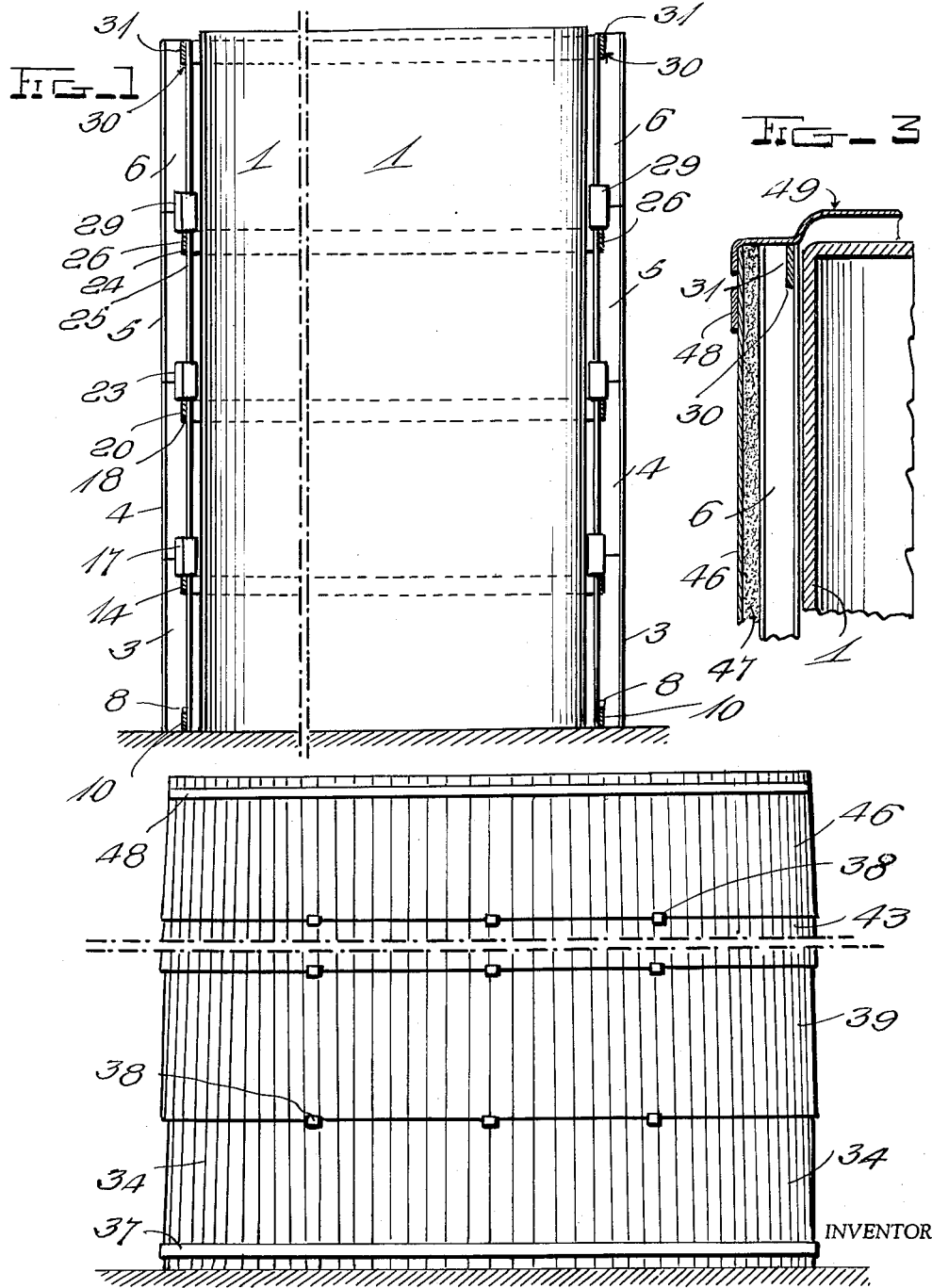

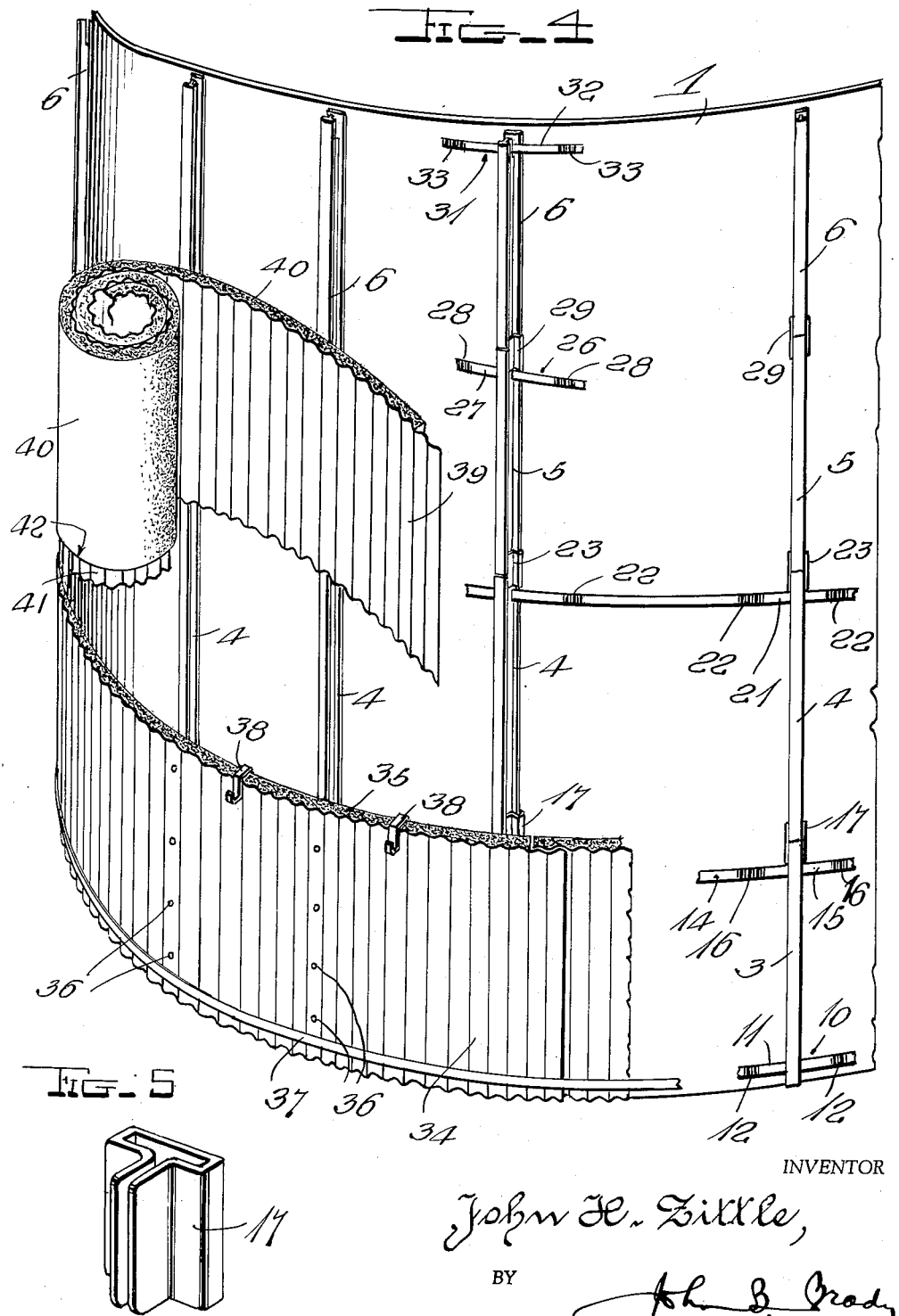

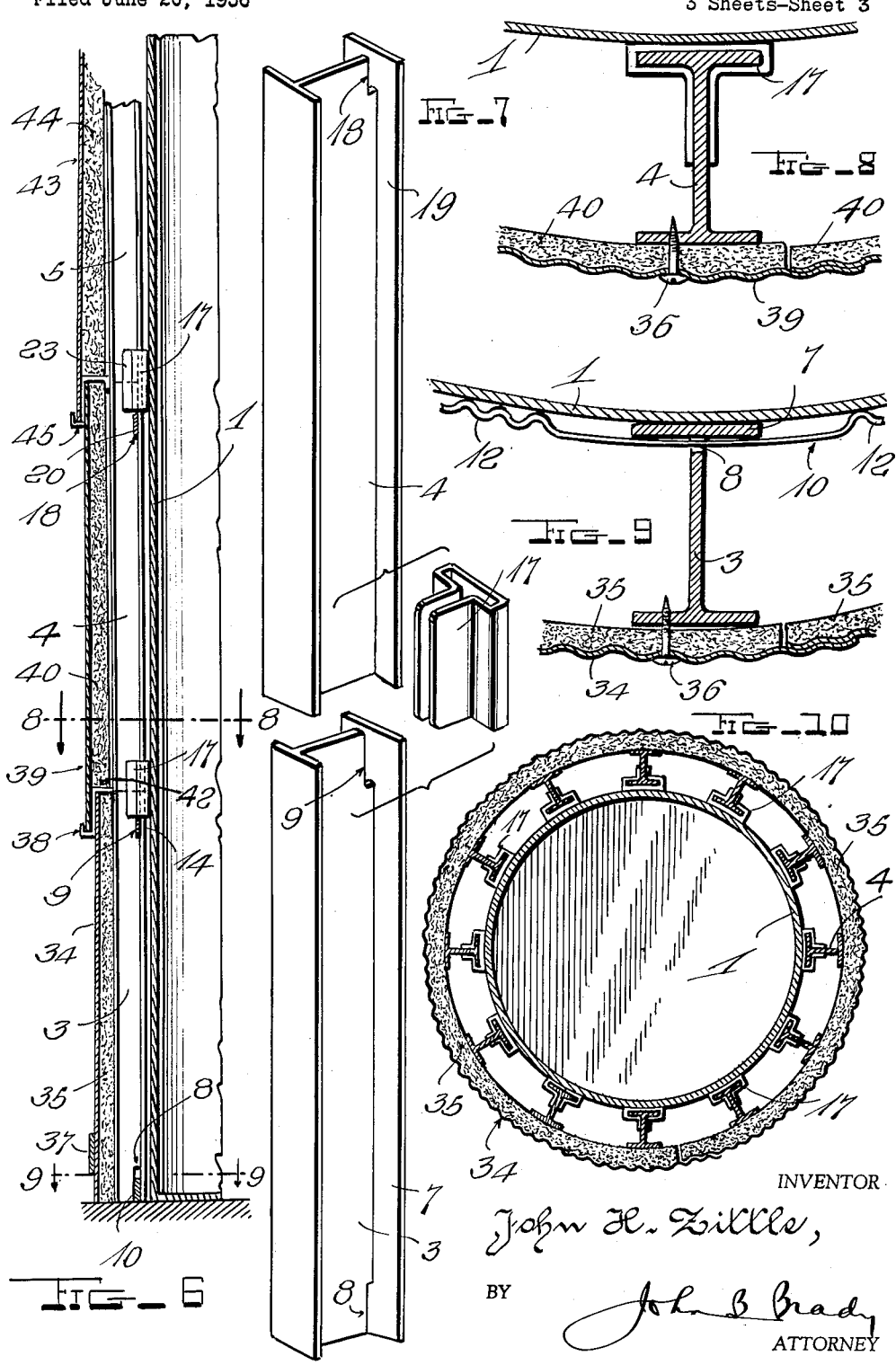

2,983,340

ROLL TYPE INSULATION

John H. Zittle, Mountville, Pa., assignor to Howe Sound Company, New York, N.Y., a corporation of Delaware Filed June 20, 1956, Ser. No. 592,518

2 Claims. (Cl. 189—3)

My invention relates broadly to insulation covering material for tanks and the like and more particularly to an assembly of cross corrugated metallic roll strip and laminated blanket insulation associated therewith.

One of the objects of my invention is to provide a thermal insulation roll material for tanks and the like which may be inexpensively manufactured and readily applied to the surface of tanks and the like.

Another object of my invention is to provide a composite assembly of cross corrugated metallic roll material and a blanket layer of insulation material which may be readily applied over a scaffolding to the surface of the tank which is to be thermally insulated.

Still another object of my invention is to provide an arrangement of supporting means for mounting cross corrugated roll material with associated blanket insulation material on the surface thereof in spatial relation to the exterior wall of a tank and the like for maintaining a dead-air space around the tank with means for positively supporting the several courses of the corrugated strips one above another.

Still another object of my invention is to provide an assembly of cross corrugated material for tanks which may be installed around the tanks without welding, enabling such installation to be made in atmospheres which are either combustible or which support combustion and where the flame of a welding tool would otherwise create a fire hazard.

Other and further objects of my invention reside in a composite assembly of cross corrugated metallic strip material and blanket insulation material in association with means for supporting such material against the side walls of a tank and the like as set forth more fully in the specification hereinafter following by reference to the accompanying drawings, in which:

Fig. 1 is a side elevational view of a tank showing the scaffolding on which the covering material of my invention is supported in relation to the surface of the tank, the view being foreshortened laterally in order to illustrate the scaffolding on a sufficiently large scale to properly illustrate the assembly;

Fig. 2 is a view illustrating the covering material of my invention applied to a tank, the view being foreshortened vertically in order to illustrate the assembly on a larger scale;

Fig. 3 is fragmentary vertical sectional view through the upper corner portion of a tank, showing the scaffolding and the cross corrugated covering material applied thereto;

Fig. 4 is a perspective view showing the cross corrugated material of my invention in the process of application to the scaffolding erected around the tank;

Fig. 5 is a perspective view illustrating one of the connector clips which are utilized to align the sections of the H or I bars forming the scaffolding for the insulation covering of my invention;

Fig. 6 is a fragmentary vertical sectional view through the wall of the tank illustrated in Figs. 1–4 and showing the scaffolding erected adjacent thereto and illustrating the composite insulation material of my invention installed thereon;

Fig. 7 is a perspective view of two of the H or I bars and the connector clip for aligning the bars to form the scaffolding around the tank for supporting the thermal insulation material of my invention;

Fig. 8 is a fragmentary transverse sectional view taken substantially on line 8—8 of Fig. 6;

Fig. 9 is a fragmentary transverse sectional view taken substantially on line 9—9 of Fig. 6; and Fig. 10 is a transverse sectional view through a typical tank construction and illustrating the composite covering material of my invention, the view illustrating the dead air space which is provided between the exterior of the tank and the interior of the insulation blanket covering carried by the cross corrugated material of the assembly of my invention.

My invention is directed to a construction of insulation covering for tanks constituted by a combination of a cross corrugated roll strip and a blanket of insulation material which may be rolled onto a scaffolding erected around outside of the tank.

The scaffolding is formed by a multiplicity of H or I bars fastened by circumferential bands to the side of the tank and coupled one above the other in vertical alignment to form a fastening means for the cross corrugated strips with the insulation blanket thereon. The cross corrugated strip and associated blanket forming the starter or first course in a typical installation is 48" wide with the blanket of insulation extending the full width of cross corrugated material. However, all other courses above the starter or first course consist of the composite cross corrugated metallic material of the same 48" width but with the blanket of insulation material cut back 4" so that the insulation material is but 44" in width. This enables the courses of the cross corrugated strips to be overlapped one above the other and supported in position by Z clips engaged over the top edge of the cross corrugated strip forming the immediately adjacent lower course. The cross corrugated metallic roll strips with the blanket of insulation material thereon are fastened to the flanges of the H or I bars clamping the blanket of insulation between the cross corrugated strip material and the scaffolding facing inwardly toward the exterior wall of the tank with a dead-air space therebetween.

The insulation material constituting the blanket layer may be constituted by a variety of different materials but I have found glass insulation laminated into a blanket most effective. The scaffolding is secured to the outside of the tank by an arrangement of circumferential expansible and contractible bands making it unnecessary to make a welded connection with the walls of the tank. This is highly desirable as the insulation material of my invention is often installed around tanks in oil refineries where welding must be limited and preferably completely eliminated as it presents a fire hazard in the vicinity of atmosphere which is either combustible or which supports combustion.

Referring to the drawings in more detail, reference character 1 designates the tank to which the covering of insulation material of my invention is to be applied. A scaffolding formed by a multiplicity of H or I bars is erected around the exterior of the tank. The bars for the first or starter course, in the example I have previously mentioned, are 48" in length, while the bars above the first or starter course are 44" in length in the example I have used for illustrative purposes. These bars are represented in Figs. 1, 4, 6 and 7 at 3, 4, 5, and 6. The H or I bars are vertically aligned and there are a multiplicity of these vertically disposed bars erected around the exterior of the tank. For purposes of explanation I have indicated the bars of the same course by similar reference characters. The H or I bars of the first or starter course shown at 3 are slotted through the webs adjacent the inside flange 7 thereof at both the top and bottom of the H or I bars as represented at 8 and 9. The slots 8 receive the circumferentially expansible and contractible band 10 which serves to maintain the H or I bars 3 of the first or starter course in position around the base of the tank 1. The band 10 contains alternate plain sections 11 and corrugated sections 12 which enables the band 10 after it has been secured in position around tank 1 with the first or starter H or I bars 3 erected thereon, to secure the first or starter course H or I bars temporarily in position while the fastening means are applied to the upper ends of the H or I bars 3. The upper ends of the H or I bars 3 have circumferential band 14 positioned in the slot 9 therein. The band 14 is similar to band 10 in that it has alternate plain portions 14 and corrugated portion 16 enabling the band to circumferentially expand and contract in accordance with conditions of the tank.

The upper ends of the H or I bars 3 receive the connector clips shown at 17. Each connector clip is shaped to fit around the rear flange 7 of the bar 3 and the web thereof and gravitate onto the circumferential band 14 and serve as a pocket for receiving the second course of H or I bars 4.

Similarly, the upper ends of the H or I bars 4 have their web slotted at 18 adjacent the inside flange 19 thereof. A circumferential band 20 having alternate plain portions 21 and corrugated portions 22 encircles the tank and extends through the slots 18 for confining the upper ends of bars 4 against the side wall of tank 1. Connector clips 23 are slipped over the upper protruding ends of the bars 4 and gravitate against the edge of the band 20. The next course of H or I bars 5 fit into the socket provided by connector clips 23. The upper ends of the H or I bars 5 are slotted as represented at 24 at positions in the webs adjacent the inside flange 25. The circumferential band 26 is fitted through the slots 24 and is similar to bands 14 and 20 with alternate plain sections 27 and corrugated sections 28, enabling the band 26 to expand and contract circumferentially. Connector clips 29 fit over the upper ends of H or I bars 5 and gravitate against the band 26. The connector clips 29 serve as sockets for the H or I bars 6 of the next course into which the H or I bars 6 fit. The upper ends of the H or I bars 6 are slotted as represented at 30 for receiving circumferential band 31. The circumferential band 31 is similar to the bands 14, 20 and 26 in that band 31 includes plain section 32 which fits through the slot 30 in the H or I bars 6 and corrugated sections 33 which enable the band 31 to expand and contract circumferentially. The bands 14, 20, 26 and 31 are suitably fastened to form continuous restraining means for the scaffolding formed by the vertically aligned H or I bars 3, 4, 5 and 6. The scaffolding serves to receive the composite insulation material of my invention. The composite material is formed by a strip of cross corrugated metal, preferably aluminum, represented at 34. The corrugations in the cross corrugated strip 34 extend vertically. The rear of the strip 34 carries a laminated layer of insulation material such as glass insulation represented at 35. The glass insulation is united to the inside of the cross corrugated strip 34 by cement or glue. The band of cross corrugated material 34 encircles the scaffolding and is secured to the outside flanges of the scaffolding by suitable screws represented at 36 in Fig. 9. The fastening screws compress the insulation 35 against the outside flanges of the H or I bars. The first course of cross corrugated material 34 with the insulation material 35 secured to the rear thereof is fastened to the flanges of the H or I bars and the first or starter course then secured firmly in position by means of an outside circumferential band 37. The upper edge of the first or starter course of the composite insulation material is then provided with spaced Z clips 38 which may extend simply over the upper metallic edge of the cross corrugated material 34 or over both the edge of material 34 as well as the edge of the metallic material 34. The spaced Z clips provide seats for the next course of insulation covering material.

In Fig. 4 I have shown the second course of insulation covering material being installed. It will be noted that this second course of cross corrugated material 39 and associated insulation layer 40 differs from the first course 34 by the fact that insulation material 40 has a width of but 44" in the illustrated example as compared to the width of the cross corrugated metallic material 39 of 48". This provides a cut back area represented at 41 which enables the second course of cross corrugated material to be laid over the first course 34 as represented more clearly in Fig. 6 with the inner surface of cross corrugated material 39 fitting into immediate contact relation to the surface of cross corrugated material 44 and with the raw edge of the insulation material 44 designated at 42 in abutment with the top circumferential edge of the insulation material 35. Thus a compact and tight joint can be established between the overlapping cross corrugated roll strip 40 and the cross corrugated roll strip 34. The next succeeding courses of roll material are applied in a manner similar to the application of the roll material 34 illustrated in Fig. 4. The third course for example is represented in Fig. 6 as consisting of the cross corrugated roll material 43 backed with the insulation material 44 which is clamped by securing means to the outside flange of the H or I bar 5. The lower edge of the cross corrugated material 43 and insulation material 44 is supported by Z clips 45 with respect to the upper edge of the cross corrugated material 39 of the second course. Similarly, the final course of cross corrugated material and insulation blanket is applied at the top of the tank as represented in Fig. 3 where the cross corrugated material is shown in fragmentary section at 46 backed by the insulation blanket 47. The lower edge of the cross corrugated roll material 46 and the blanket 47 associated therewith is supported by Z clips 51 similar to the Z clips 38 and 45. The upper end of the cross corrugated material 46 is secured in place by a circumferential band 48. The closure top for the tank is represented at 49 fitting around the upper end of the cross corrugated material 46 as shown at the skirt 50.

The cross corrugated roll strips of each course extend on one end beyond the blanket of insulation associated therewith. This permits the overlapping of the metallic ends of the cross corrugated strip and the abutment of the blanket of insulation material, circumferentially end-to-end as shown more clearly in Figs. 4, 8, 9 and 10. That is to say the end of the blanket of insulation material 40 is cut back at 52 for example as shown in Figs. 4 and 8 with the metallic roll material extending beyond the termination of the insulation blanket for effecting the overlap joint represented for example in Figs. 8, 9 and 10.

The insulation covering as described herein has been found to be very convenient in installation and use and while I have described my invention in one of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. An insulated tank structure comprising a tank, a plurality of sectionalized courses encircling the tank in a sheath of heat insulation, each course consisting of a plurality of spaced vertically disposed "I" members each having an inner vertically extending flange substantially contacting the external surface of the encircled tank and an outer flange interconnected by a radially disposed web, each of said "I" members having a slot in the upper portion of the web thereof immediately adjacent the inner flange thereof, a band member extending through the slots in the webs of each of said "I" members and encircling the external surface of the tank with the upper peripheral edges of said band terminating in a position substantially below the upper ends of said "I" members, a coupling connector engaged over the upper end of each of said "I" members and gravitated to a position in which the lower end of said coupling connector is supported by the upper peripheral edge of said band and where the upper ends of said coupling connectors project above the upper ends of said "I" members, the "I" members of the next adjacent course having the lower ends thereof supported in the upper ends of said coupling connectors, each of said courses including a cross-corrugated continuous metallic strip of a width substantially equal to the height of said "I" members with the cross-corrugations extending in a direction coincident with the axes of said "I" members and having a covering of insulation material on the inner surface thereof contacting the outer flanges of said "I" members and the coupling connectors thereon with the insulation material directed inwardly toward the external surface of the tank, and means fastening said metallic strip to the outer flanges of said "I" members.

2. An insulated tank structure as set forth in claim 1 in which the top horizontal edge of said covering of insulation material is horizontally aligned with the upper peripheral edge of the cross-corrugated continuous metallic strip and wherein the lower horizontal edge of said covering of insulation material terminates short of the lower peripheral edge of the cross-corrugated continuous metallic strip providing a marginal portion of the metallic strip depending beyond the lower edge of the covering of insulation material thereon in one course for overlapping the upper portion of the exterior surface of the cross-corrugated strip in the immediately adjacent course and with the insulation material on the inner surface of each of said strips longitudinally aligned end-to-end, and brackets supported over the top horizontal edge of said covering of insulation material and the upper peripheral edge of said cross-corrugated continuous metallic strip at spaced intervals and depending beneath and supporting the edges of the marginal portion of the metallic strip which depends beyond the lower edge of the covering of insulation material for maintaining adjacent courses in alignment.

References Cited in the file of this patent
UNITED STATES PATENTS

| | | |
|---|---|---|
| 1,674,842 | Sparks | June 26, 1928 |
| 2,216,206 | McKee | Oct. 1, 1940 |
| 2,218,426 | Hurlbert | Oct. 15, 1940 |
| 2,264,961 | Ward | Dec. 2, 1941 |
| 2,323,297 | Collins | July 6, 1943 |
| 2,511,083 | Small | June 13, 1950 |
| 2,666,004 | Gerrard | Jan. 12, 1954 |
| 2,671,492 | Biordi et al. | Mar. 9, 1954 |
| 2,746,578 | Blomeley | May 22, 1956 |